US007027709B2

(12) United States Patent
Matsui et al.

(10) Patent No.: US 7,027,709 B2
(45) Date of Patent: Apr. 11, 2006

(54) METHOD FOR FORMING MAGNETIC GAP OF VIDEO SIGNAL ERASURE HEAD, ERASURE HEAD, AND VIDEO RECORDER HAVING THE SAME

(75) Inventors: Kiyoshi Matsui, Koidemachi (JP); Yoshinobu Umaji, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1073 days.

(21) Appl. No.: 09/847,537

(22) Filed: May 1, 2001

(65) Prior Publication Data

US 2002/0001156 A1 Jan. 3, 2002

(30) Foreign Application Priority Data

May 10, 2000 (JP) ............................ 2000-136990

(51) Int. Cl.
*H04N 5/76* (2006.01)
*G11B 5/127* (2006.01)

(52) U.S. Cl. ........................................ 386/46; 360/118

(58) Field of Classification Search .................. 386/46; 360/118–122, 125, 130.21; H04N 5/76
See application file for complete search history.

(56) References Cited

U.S. PATENT DOCUMENTS

| | | | | |
|---|---|---|---|---|
| 4,264,939 A | | 4/1981 | Takii et al. | 360/118 |
| 4,387,410 A | * | 6/1983 | Takanohashi et al. | 360/118 |

FOREIGN PATENT DOCUMENTS

| | | |
|---|---|---|
| JP | 56-77020 | 11/1979 |
| JP | 57-173124 | 4/1981 |
| JP | 63-99307 | 6/1988 |
| JP | 02-046510 | 2/1990 |
| JP | 07-220229 | 8/1995 |

* cited by examiner

*Primary Examiner*—Thai Tran
(74) *Attorney, Agent, or Firm*—Seed IP Law Group PLLC

(57) ABSTRACT

The invention provides a simple method for forming a gap for an erasure head to improve the quality of this erasure head. A front core 3 constituting an erasure head H includes in configuration two magnetic substances 5 and a magnetic gap 6 made of a non-magnetic substance arranged between these two magnetic substances 5, in which the gap 6 made of the non-magnetic substance is bonded by adhesion or welding between those two magnetic substances 5. By this method, the gap can be formed free of an air bubble, with good mass-productivity, and inexpensively as compared to a prior art method of forming a gap by glass bonding.

2 Claims, 10 Drawing Sheets

METHOD FOR FORMING MAGNETIC GAP OF VIDEO SIGNAL ERASURE HEAD, ERASURE HEAD, AND VIDEO RECORDER HAVING THE SAME

BACKGROUND OF THE INVENTION

The invention relates to a method for forming a gap for an erasure head in a video apparatus, an erasure head, and a video recorder having the same.

There has conventionally been known such a configuration for a full-width erasure head used in a video cassette recorder (VCR) etc. that as disclosed in, e.g. Japanese Utility Model Application No. SHO 56-77020, SHO 57-173124, or SHO 63-99307 or Japanese Unexamined Patent Publication No. HEI 7-220229, to form a head gap for that head, two cores made of a magnetic substance sandwich therebetween a sheet made of a non-magnetic substance used as a gap and two sheets of an adhering or welding member sandwiching this non-magnetic sheet so that the cores and the non-magnetic sheet may be adhered or welded with each other via these sheets of adhering or welding members.

Besides the above-mentioned configuration that one sheet of non-magnetic substance and two sheets of adhering or welding members are interposed between two cores, there has been known such a configuration that a melting type non-magnetic substance is melted between two cores and then solidified to provide a gap by itself. Specifically, the gap is formed according to steps shown in FIGS. 10. In the back face of a magnetic block 100 shown in FIG. 10(*a*), a rectangular escape portion 101 is formed upward from the bottom face of the magnetic substance 100 by cutting and the like as shown in FIG. 10(*b*). Next, as shown in FIG. 10(*c*), in the top face of the magnetic substance 100, a groove 102 is formed downward by cutting etc. in a rough C-shape and perpendicular to the extension direction of the escape portion 101, following which, as shown in FIG. 10(*d*), in the center line of the bottom of the groove 102, a roughly rectangular gap groove 103 with an appropriate width is formed by cutting etc. in the extension direction of the groove 102. Next, as shown in FIG. 10(*e*), a non-magnetic glass rod 104 is placed on the gap groove 103 and then, as shown in FIG. 10(*f*), is melted and flowed by an appropriate method into the gap groove 103 and solidified, so that then the bottom surface of the magnetic block 100 is polished to a curved face (R-shape) indicated by a broken line 106, thus finally forming a core 110 having a shape indicated in FIG. 10(*g*).

However, in a configuration disclosed in Japanese Utility Model Application No. SHO 56-77020, 57-173124, or SHO 63-99307 or Japanese Unexamined Patent Application No. HEI 7-220229, to form a gap in an existing core, it is necessary to use one sheet of a non-magnetic substance and two sheets of an adhering or welding member by a complicated engineering method, thus resulting in poor productivity and expensive manufacturing costs. This in turn increases the costs for manufacturing an erasure head or video recorder using such a core. Moreover, a core formed by a method shown in FIGS. 10 has a small gap width of 50–100 μm and so is difficult to machine and also, to avoid cracking the core when it is formed by heating a core material, e.g. ferrite, and a gap material, e.g. glass, it is necessary to match their linear expansion coefficients properly, which is accompanied by such another problem that the glass melted and flowed into the gap is liable to have an air bubble generated therein and if it occurs in the glass surface, that surface has a minute recess, to which a magnetic particle from a tape is liable to stick when the tape travels in contact with the gap, thus deteriorating the video signal quality and resulting in noise being raised at the recess.

SUMMARY OF THE INVENTION

In view of the above, it is an object of the invention to provide a simple method for forming a gap at a high quality erasure head, an erasure head formed by this method, and a video recorder using this erasure head.

This is accomplished by a method according to the invention for forming a magnetic gap for a video signal erasure head. The erasure head comprises a back core made of a magnetic substance wound with an excitation coil and a front core arranged opposite to this back core, in which the above-mentioned front core includes two magnetic substances constituting a magnetic path and a non-magnetic substance interposed between these to provide a magnetic gap; said magnetic gap forming method comprises the steps of sandwiching the above-mentioned non-magnetic substance between the above-mentioned two magnetic substances when the above-mentioned front core is assembled; and adhering or welding the above-mentioned magnetic substances and non-magnetic substance with each other integrally.

According to the invention, a front core having a non-magnetic gap constituting an erasure head is formed by a simple method without generating an air bubble in the gap, thus avoiding forming a recess in the gap surface.

The above-mentioned video signal erasure head gap forming method according to the invention comprises the steps of sandwiching a sheet-shaped non-magnetic substance which provides a magnetic gap between the above-mentioned two magnetic substances to thereby adhere or weld the above-mentioned non-magnetic substance to the above-mentioned magnetic substances in order to form an integrated assembly; cutting an expected rear side surface of a head in this assembly in the height direction of the head to thereby form a groove; and polishing an expected front side surface of the head in the above-mentioned assembly so that it may provide an axi-symmetrical curved face.

By this method, it is possible to simultaneously conduct the step of forming the front core made of the magnetic substances constituting the erasure head and the step of forming the gap made of the non-magnetic substance.

According to the invention, the above-mentioned assembly is a block in shape with a size large enough to form a plurality of front cores at a time, with the gap being formed by a further step of, prior to the above-mentioned polishing step, cutting and dividing the above-mentioned assembly in a direction perpendicular to the face of the above-mentioned non-magnetic substance into a plurality of sub-assemblies having the same size. By this method, it is possible to manufacture the front core in which the non-magnetic substance providing the gap is sandwiched between the two magnetic substances, more than one at a time.

The invention relates to a video signal erasure head having a gap formed by the above-mentioned method.

BRIEF DESCRIPTION OF THE DRAWINGS

The above and other objects, advantages, and features of the invention will be more apparent from the following description taken in conjunction with the accompanying drawings, in which.

DETAILED DESCRIPTION OF THE PREFERRED EMBODIMENTS

Figure 1:
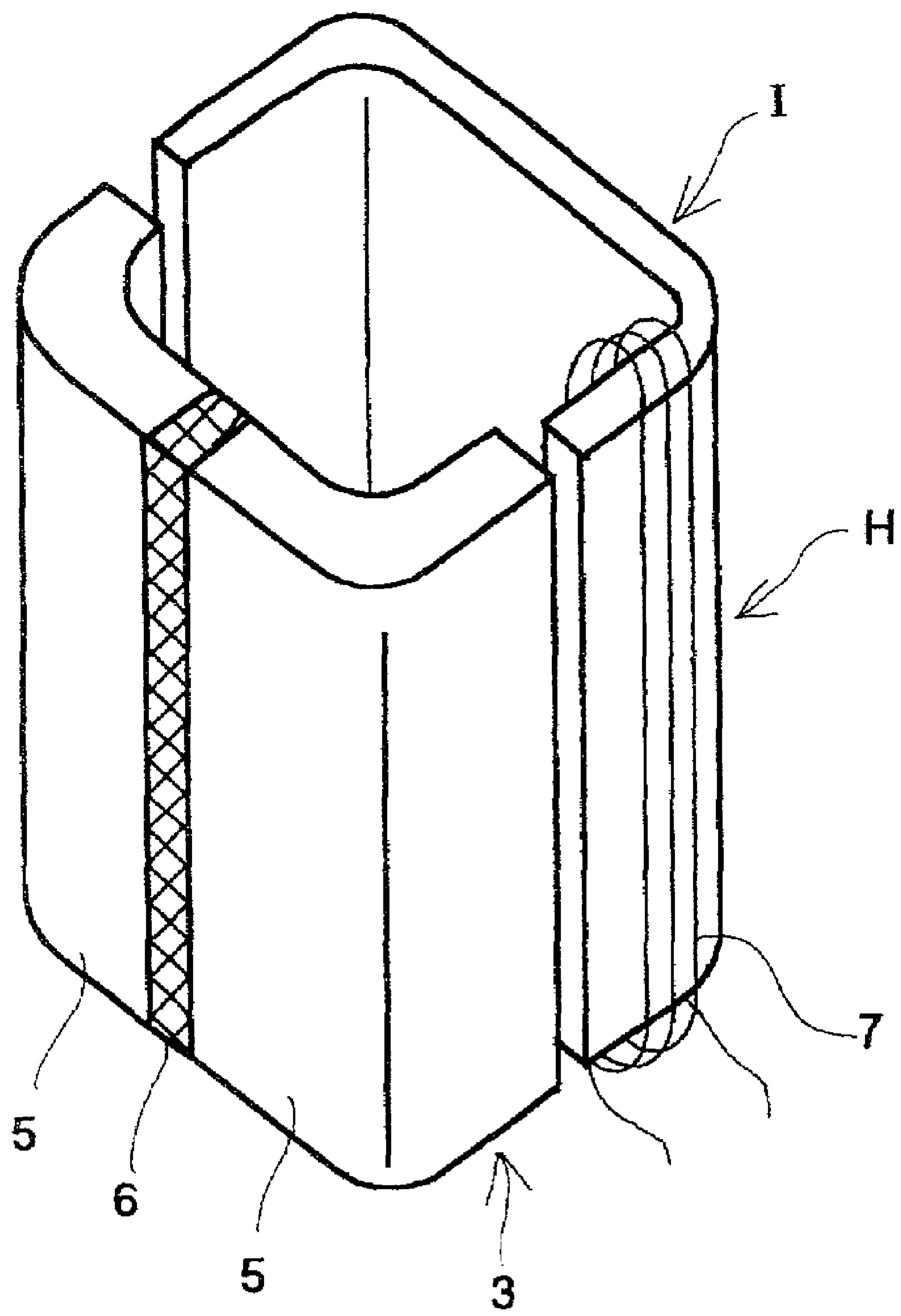
FIG. 1 is a perspective view for showing an erasure head related to one embodiment of the invention.
Figure 2A:
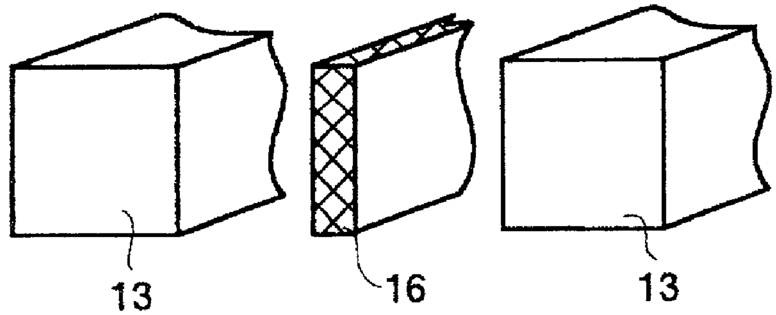
FIGS. 2(*a*) to 2(*d*) are illustrations for showing steps of forming a front core having a gap.
Figure 2B:
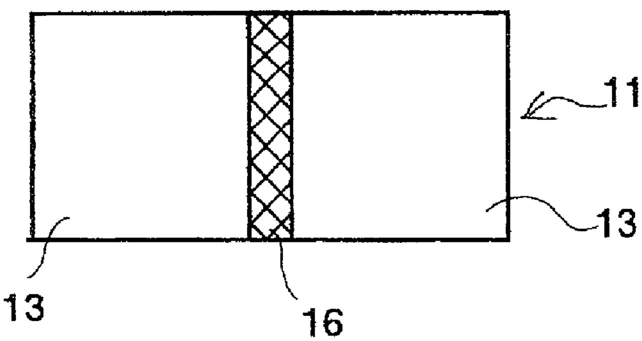
Figure 2C:
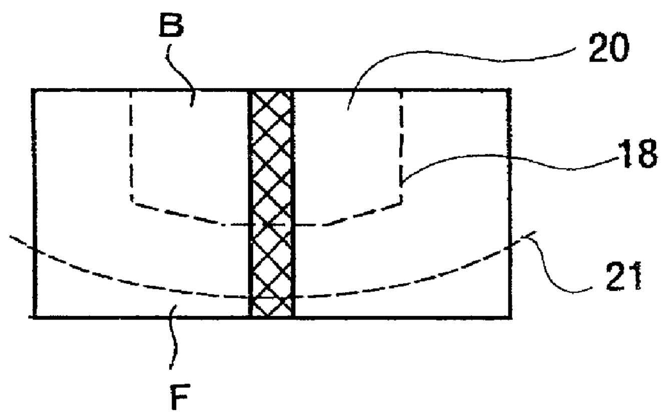
Figure 2D:
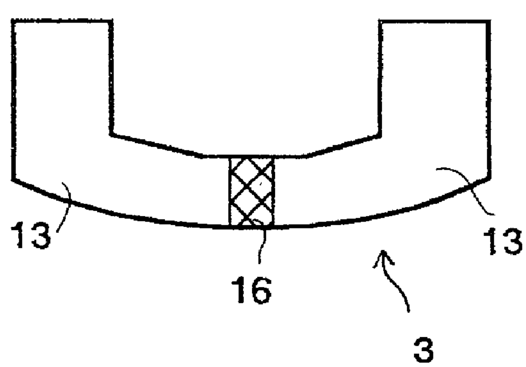
Figure 3A:
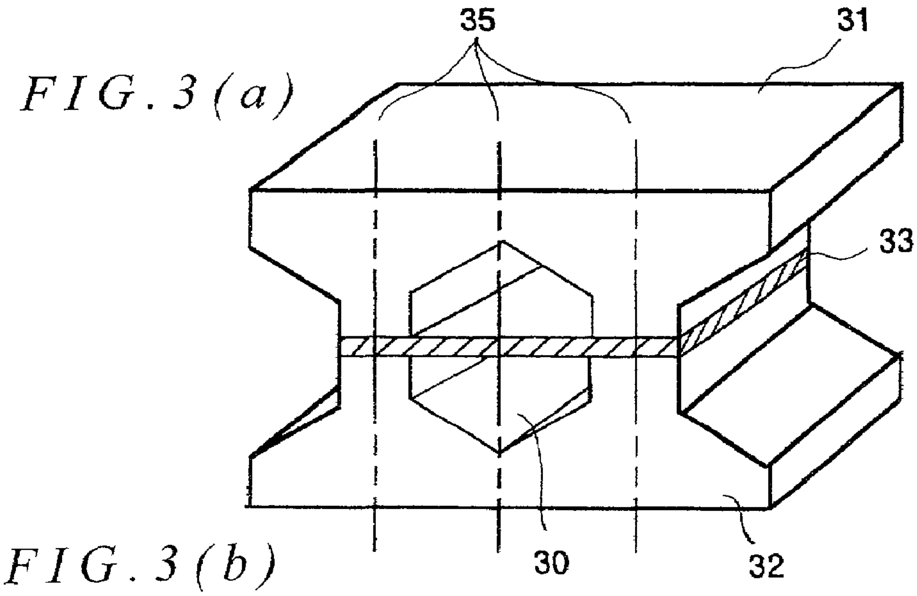
FIGS. 3(*a*) to 3(*d*) are illustrations for showing steps of forming the front core having the gap more than one at a time.
Figure 3B:
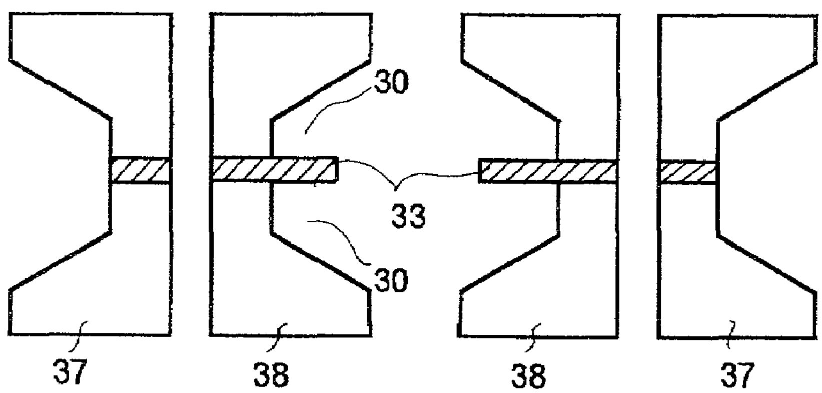
Figure 3C:
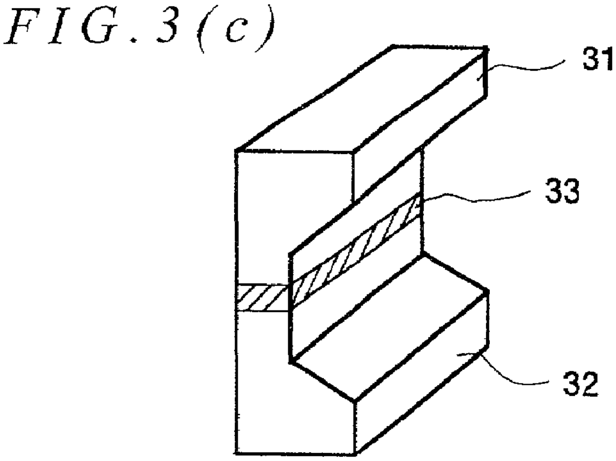
Figure 3D:
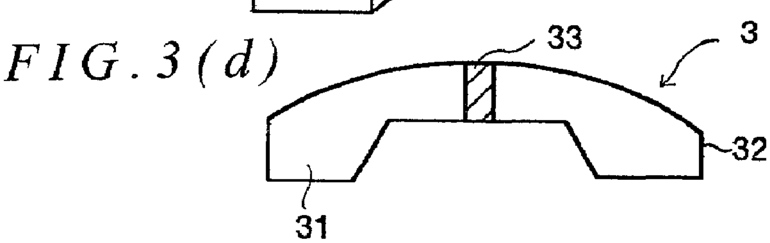

The following will describe a method for forming a gap for an erasure head used in a video cassette recorder related to one embodiment of the invention (or an erasure head and a video recorder manufactured by this method for forming the gap according to the invention) with reference to the drawings. FIG. 1 is a perspective view for showing an erasure head H in one embodiment of the invention. The erasure head H comprises a C-shaped back core 1 made of a magnetic substance (e.g., ferrite) and a front core arranged opposite to this back core 1 in such a configuration that this front core 3 is formed by arranging a magnetic gap 6 made of a non-magnetic substance (e.g., non-magnetic ferrite, glass, or plastic) between two magnetic substances 5 with its both sides being in contact with the side faces of the respective magnetic substances 5. The back core 1 is wound with a coil 7.

FIG. 2 show steps for forming the above-mentioned front core 3. FIG. 2(*a*) is an perspective view and FIGS. 2(*b*)–2(*d*) are top views. As shown in FIG. 2(*a*), two blocks 13, 13 made of a magnetic substance sandwich a non-magnetic substance 16, which is adhered or welded with the two blocks 13, 13 to thereby form one block 11 (assembly) as shown in FIG. 2(*b*). The adhesive agent used here may be an epoxy resin. Next, as shown in FIG. 2(*c*), in a face B of the rear side of the head, the block 11 is cut from its top face downward (in the head height direction) to a position indicated by a dotted line 18 to thereby form a groove 20. Then, a face F of the front side of the block 11 is polished to a shape indicated by a dotted line 21 to provide a round shape (R-shape), thus forming a shape of a front core 3 such as shown in FIG. 2(*d*). After the non-magnetic substance 16 is thus adhered or welded as the magnetic gap between the two magnetic substances 13, 13 to then form the front core 3 machine by machining, the front core 3 can be formed by a simple method. They are welded specifically by placing the nonmagnetic substance 16 as sandwiched by the two blocks 13, 13 with a pressure in a heating furnace and then welding them. Preferably, the non-magnetic substance used in welding is non-magnetic ferrite.

FIG. 3 show steps for forming the front core more than one at a time. FIGS. 3(*a*) and 3(*c*) are perspective views and FIGS. 3(*b*) and 3(*d*) are side views. As shown in FIG. 3(*a*), by sandwiching a sheet-shaped non-magnetic substance 33 between symmetrically-shaped upper block 31 and lower block 32 made of a magnetic substance in which a groove 30 is previously formed at a predetermined pitch more than one in a face expected to be a head side face to then adhere or weld the non-magnetic substance 33 to the upper block 31 and the lower block 32, thus forming a larger sized block (assembly). Next, this large-sized block is cut off vertically along three two-dots-and-dash lines 35 perpendicular to the face of the non-magnetic substance 33 to thereby provide four blocks 37 and 38 as shown in FIG. 3(*b*). Then, each block shown in FIG. 3(*c*) is polished so as to provide a curved face (R-shape) opposing to the groove 30 in the block, thus completely forming the front core 3 as shown in FIG. 3(*d*). By this method, it is possible to simultaneously manufacture more than one the front core in which the non-magnetic substance is sandwiched between the two magnetic substances.

Figure 4A:
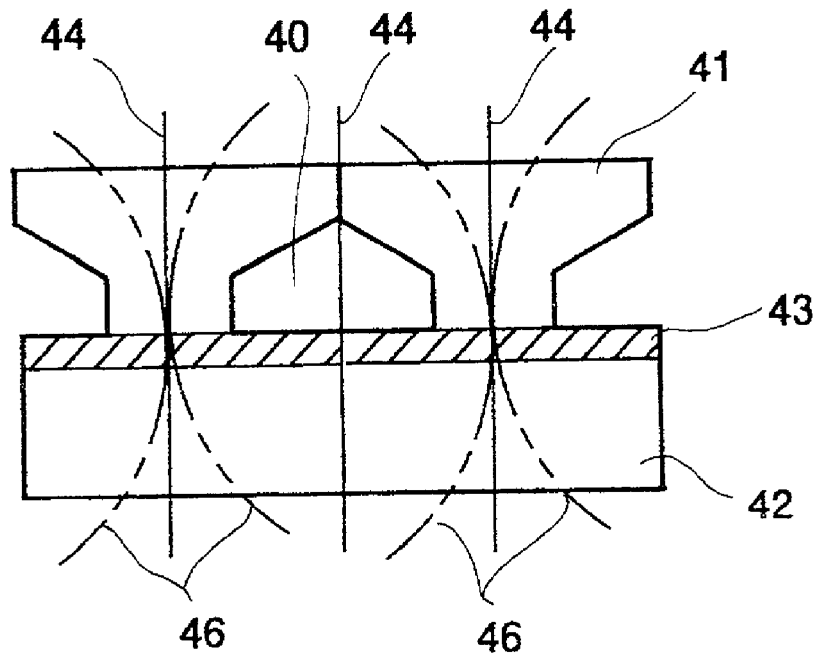
FIGS. 4(*a*) and 4(*b*) are illustrations for showing other steps for forming the front core having the gap more than one at a time.
Figure 4B:
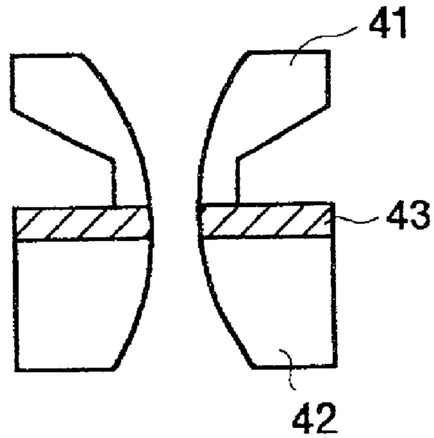

FIGS. 4 to 7 respectively show other methods for simultaneously forming a plurality of front cores by sandwiching one sheet of non-magnetic substance between two magnetic blocks. In FIG. 4(*a*), a sheet-shaped non-magnetic substance 43 is sandwiched between a magnetic block 41 having a gap 40 therein and a magnetic block 42 having no gap therein and then adhered or welded with each other, thus forming a large-sized block (assembly). Next, this large-sized block is cut off along a solid line 44 perpendicular to the face of the non-magnetic substance 43 to thereby form four blocks (two of which are shown in FIG. 4(*b*)), which are then polished to provide a curved face (R-shape) indicated by a two-dots-and-dash line 46 to thereby form a plurality of front cores at a time. Although in this embodiment of the method, the four blocks have been formed at a time, the magnetic block prior to being cut off may be of an even larger size to thereby form the block more than four at a time.

Figure 5A:
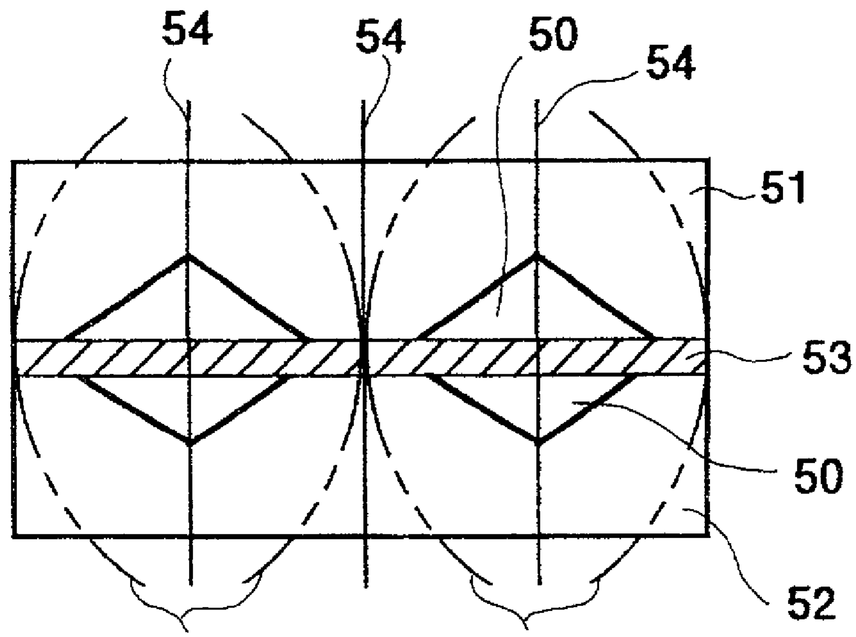
FIGS. 5(*a*) and 5(*b*) are illustrations for showing further other steps for forming the front core having the gap more than one at a time.
Figure 5B:
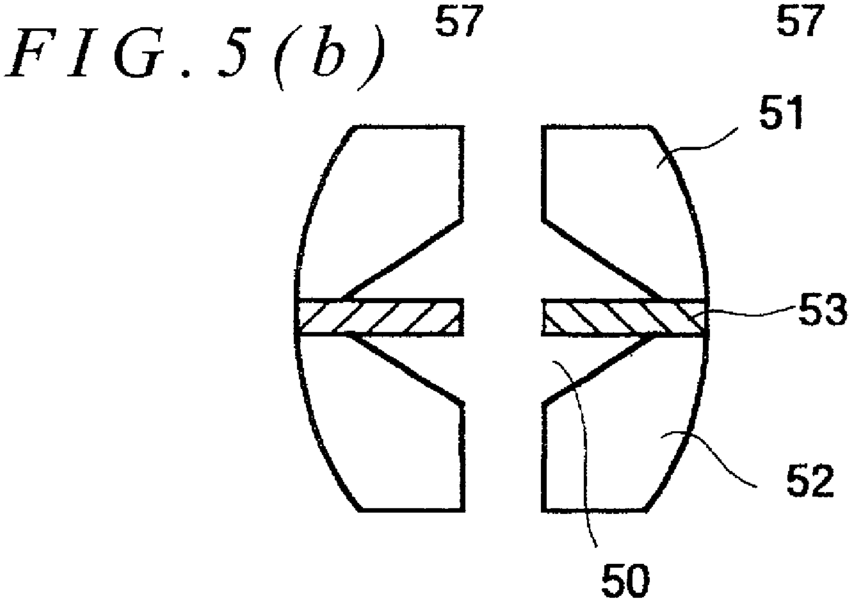

In FIG. 5(*a*), a sheet-shaped non-magnetic substance 53 is sandwiched between two axi-symmetrical blocks 51 and 52 having a gap 50 therein of the same shape, which are then adhered or welded with each other to thereby provide a large sized block (assembly). Next, this large-sized block is cut off along a solid line 54 perpendicular to the face of the non-magnetic substance 53 to thereby form four blocks (two of which are shown in FIG. 5(*b*)), which are then polished to a curved face (R-shape) indicated by a two-dots-and-dash line 57 to thereby form a plurality of front cores at a time.

Figure 6A:
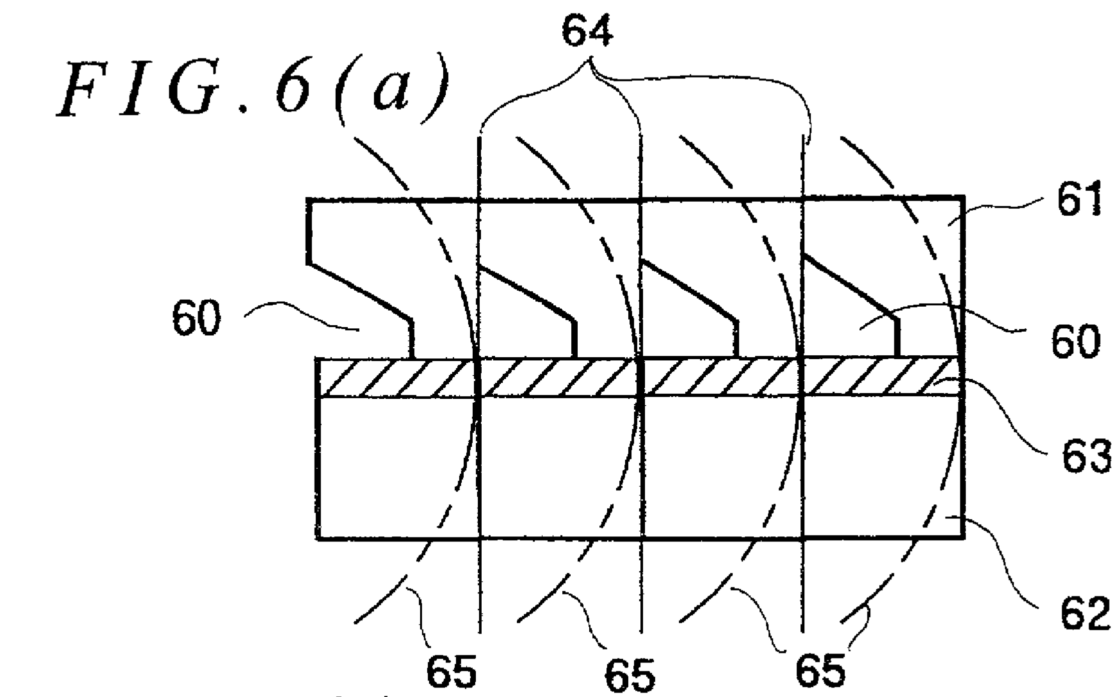
FIGS. 6(*a*) and 6(*b*) are illustrations for showing further other steps for forming the front core having the gap more than one at a time.
Figure 6B:
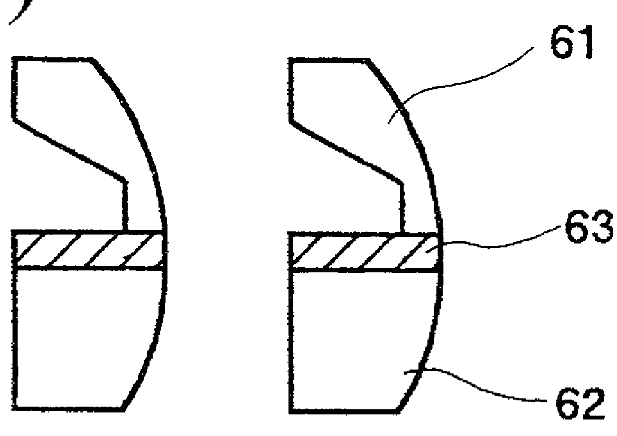

In FIG. 6(*a*), a sheet-shaped non-magnetic substance 63 is sandwiched between a magnetic block 61 having a gap 60 therein and a magnetic block 62 having no gap therein, which are then adhered or welded with each other to thereby provide a large sized block (assembly). Next, this large-sized block is cut off along a solid line 64 perpendicular to the face of the non-magnetic substance 63 to thereby form four blocks (two of which are shown in FIG. 6(*b*)), which are then polished to a curved face (R-shape) indicated by a two-dots-and-dash line 65 to thereby form a plurality of front cores at a time.

Figure 7A:
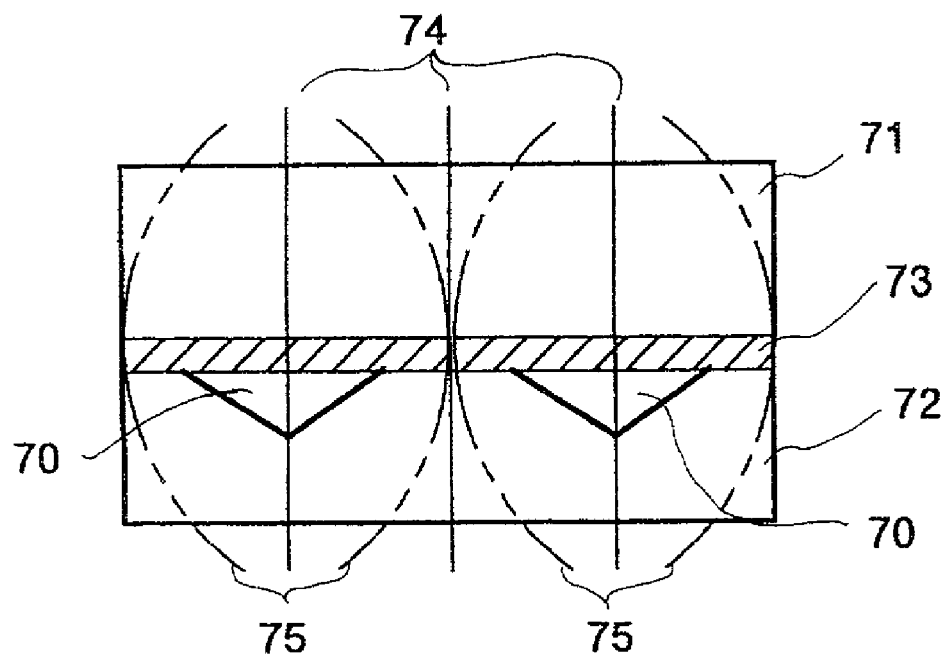
FIGS. 7(*a*) and 7(*b*) are illustrations for showing further other steps for forming the front core having the gap more than one at a time.
Figure 7B:
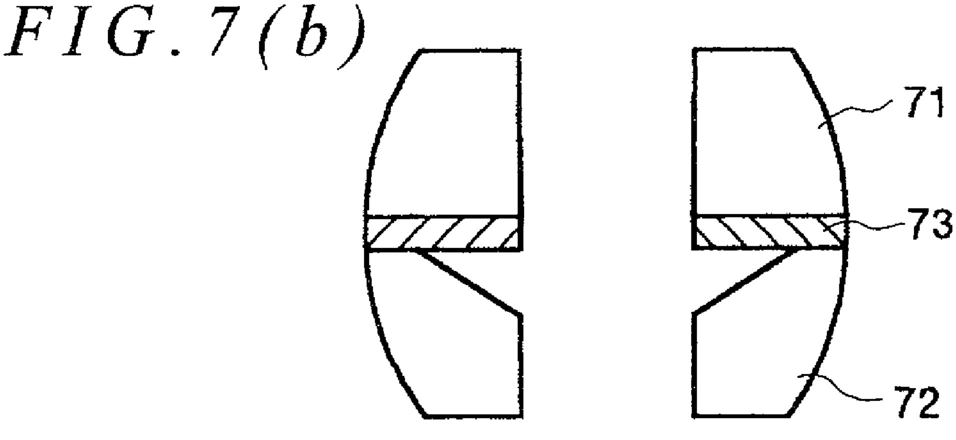

In FIG. 7(*a*), a sheet-shaped non-magnetic substance 73 is sandwiched between a magnetic block 71 having no gap therein and a magnetic block 72 having a gap 70 therein, which are then adhered or welded with each other to thereby provide a large sized block (assembly). Next, this large-sized block is cut off along a solid line 74 perpendicular to the face of the non-magnetic substance 73 to form four blocks (two of which are shown in FIG. 7(*b*)), which are then polished to a curved face (R-shape) indicated by a two-dots-and-dash line 75 to thereby form a plurality of front cores at a time.

Figure 8A:
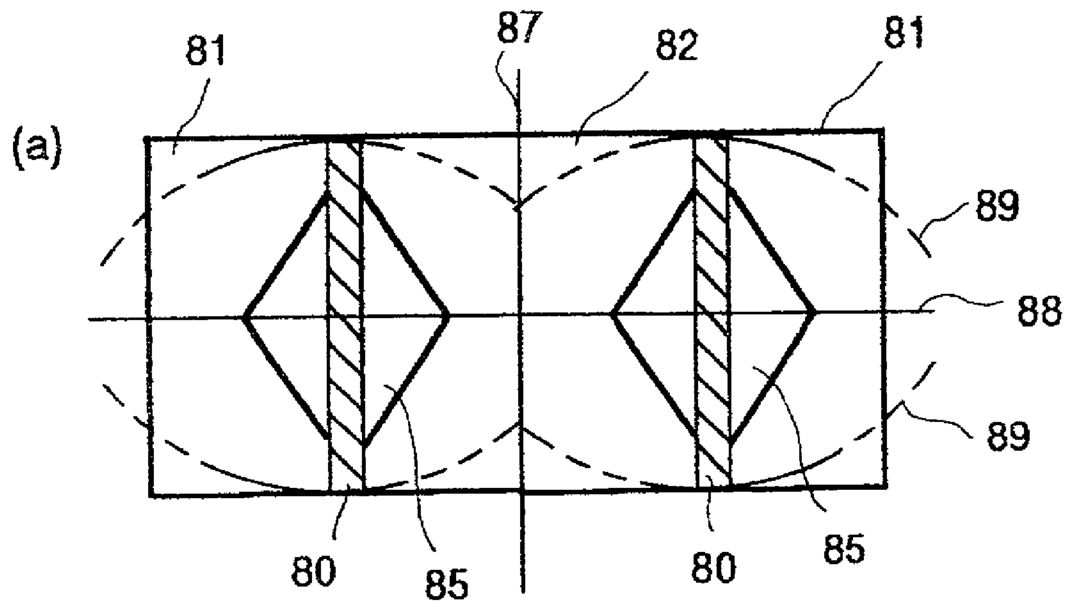
FIGS. 8(*a*) and 8(*b*) are illustrations for showing further other steps for forming the front core having the gap more than one at a time.
Figure 8B:
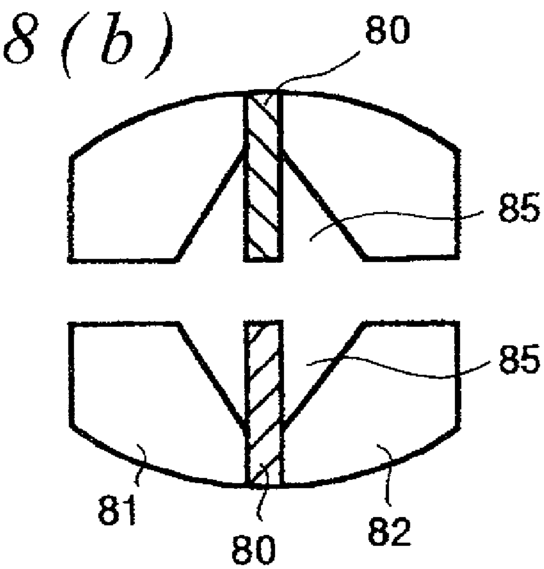
Figure 9A:
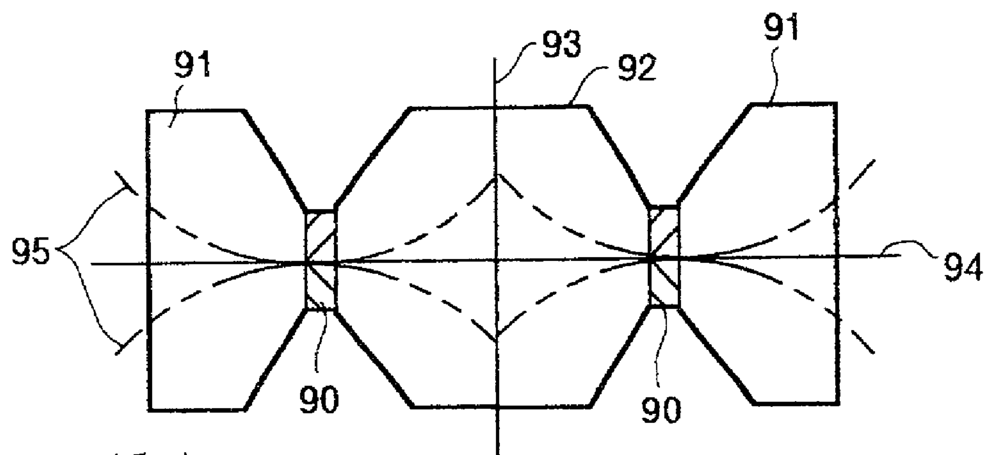
FIGS. 9(*a*) and 9(*b*) are illustrations for showing further other steps for forming the front core having the gap more than one at a time.
Figure 9B:
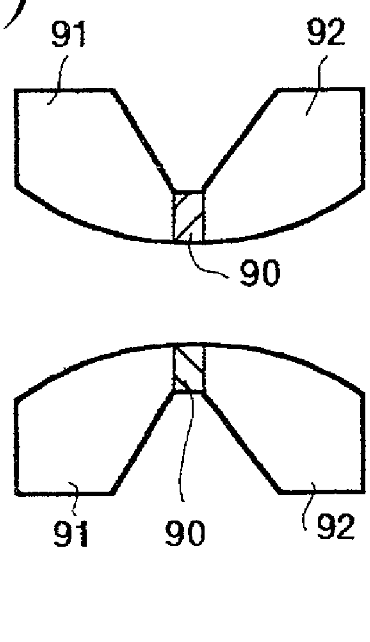
Figure 10A:
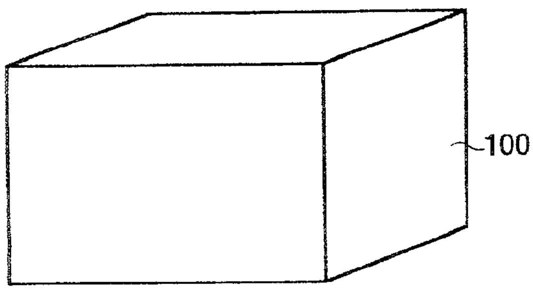
FIGS. 10(*a*) to 10(*g*) are illustrations for showing one example of a prior art gap forming method.
Figure 10B:
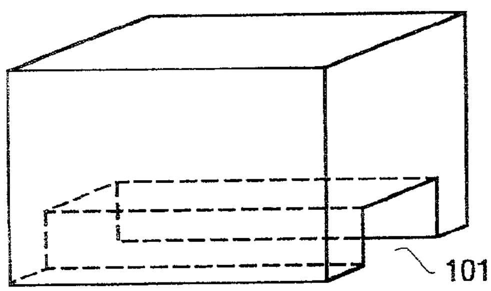
Figure 10C:
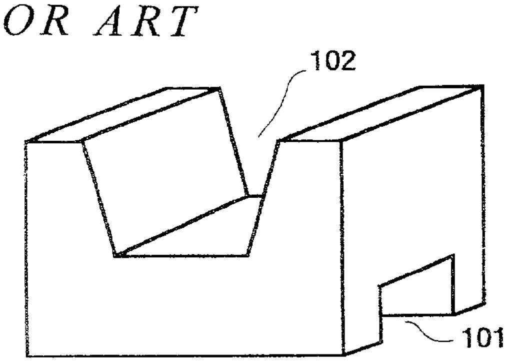
Figure 10D:
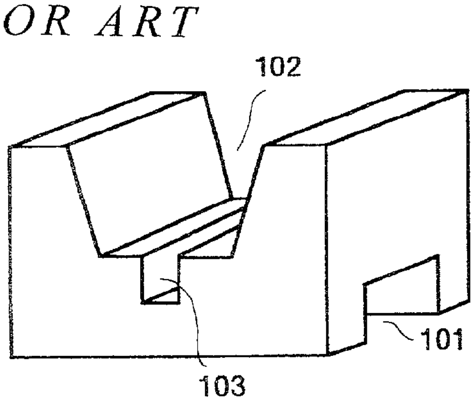
Figure 10E:
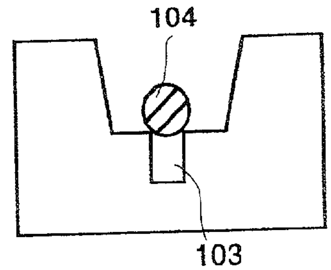
Figure 10F:
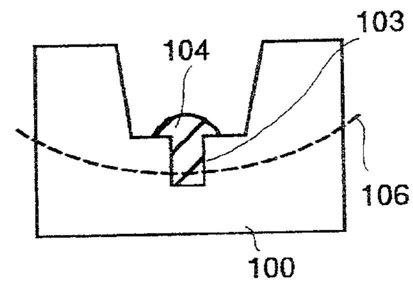
Figure 10G:
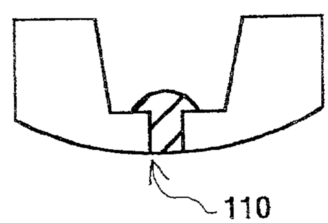

FIGS. 8 to 9 respectively show methods for forming a plurality of front cores at a time by using a plurality of sheets of non-magnetic substances. In FIG. 8(*a*), each of at least two sheets of a non-magnetic substance 80 is sandwiched between a predetermined-sized first magnetic substance 81 having a gap 85 therein and a second magnetic substance 82 which has roughly twice the size of the first magnetic substance and also which has the gap 85 therein, which are then adhered or welded to thereby provide a large sized block (assembly). Next, this large-sized block is cut off along a solid line 87 parallel to the face of the nonmagnetic substance 80 and also along a solid line 88 perpendicular to the face of the non-magnetic substance 80 to thereby form four blocks (two of which are shown in FIG. 8(*b*)), which are then polished to a curved face (R-shape) indicated by a two-dots-and-dash line 89 to thereby form a plurality of front cores at a time. In the embodiment of this method, although the four blocks have been formed at a time, the number of the sheets of the non-magnetic substance may be further increased to provide a configuration of sandwiching these non-magnetic substances between a further larger number of the magnetic blocks, thus forming the block more than five at a time.

In FIG. 9(*a*), each of at least two sheets of a non-magnetic substance 90 is sandwiched between a first magnetic substance 91 with a predetermined size and a roughly double sized second magnetic substance 92, which are then adhered or welded with each other to thereby provide a large sized block (assembly). Next, this large-sized block is cut off along a solid line 93 parallel to the face of the magnetic substance 90 and also along a solid line 94 perpendicular to the face of the non-magnetic substance 90 to thereby form four blocks (two of which are shown in FIG. 9(*b*)), which are then polished to a curved face (R-shape) indicated by a two-dots-and-dash line 95 to thereby form a plurality of front cores at a time.

An erasure head formed by any of the following methods is employed as a full-width erasure head in a video recorder.

As mentioned above, by a method of the invention for forming a gap for an erasure head, since two cores made of a magnetic substance and a non-magnetic substance providing a gap are integrally formed by adhesion or welding, as compared to using a prior art of glass bonding, the front core can be formed simply with improved mass-productivity and lower manufacturing costs so as to provide a smooth gap surface kept free of a magnetic particle from a tape and also with no air bubble generated in the non-magnetic substance constituting the gap, thus preventing the video signal from being deteriorated.

Also, it is possible to form the front core made of a magnetic substance constituting the erasure head and the gap made of a non-magnetic substance without a step of forming the groove in the gap, thus simplifying the manufacturing steps as a whole. And, it is possible to form a plurality of front cores in each of which a gap constituting non-magnetic substance is sandwiched between two magnetic substances, thus reducing the time required for manufacturing and also simplifying the manufacturing steps. Also, the front core can be formed simple, thus reducing the costs for manufacturing an erasure head using this front core. This in turn reduces the costs for manufacturing a video recorder using such an inexpensive erasure head.

What is claimed is:

1. A method for forming a magnetic gap for a video signal erasure head, wherein:

said erasure head comprises a back core made of a magnetic substance which is wound with an excitation coil and a front core arranged opposite to said back core;

said front core includes two magnetic substances constituting a magnetic path and a non-magnetic substance providing a magnetic gap arranged therebetween;

said magnetic gap forming method comprises the steps of:

(a) forming an integrated assembly, which is the front core, by sandwiching a non-magnetic substance providing a magnetic gap between said two magnetic substances, and then adhering said non-magnetic substance to said magnetic substances, wherein said assembly is formed as a block having a size enough to form a plurality of front cores therein at a time, and wherein the magnetic substance has a previously formed groove by cutting in a face providing a head rear side thereof;

(b) cutting and dividing said assembly in a direction perpendicular to the face of said non-magnetic substance into a plurality of sub-assemblies having an equal size; and (c) polishing a face providing a front side of said head in said assembly to an axis-symmetrical curved face.

2. A method for forming a plurality of front core members having a sensing surface of a magnetic head comprising:

forming a groove in a first surface of a first magnetic substance, the grove having a top region at the first surface and a valley spaced from the first surface;

placing a first surface of a second magnetic substance adjacent to the first surface of the first magnetic substance, placing a non-magnetic substance between the first magnetic substance and the second magnetic substance in contact with the first surface of the first magnetic substance and the first surface of the second magnetic substance, the non-magnetic substance contacting the first surface of the first magnetic substance at a plurality of locations corresponding the top region of the groove;

adhering the non-magnetic substance to the first and second magnetic substances to form an integrated assembly;

cutting the integrated assembly along a line perpendicular to the first surface of the first member and parallel to the sensing surface of the front core member to obtain a plurality of individual front core members;

polishing a cut surface of the individual front core members to provide the sensing surface of the front core to act as a front side of said head in said assembly.

* * * * *